n-STATE CONTROL CIRCUIT

Filed March 30, 1966 2 Sheets-Sheet 1

INVENTOR
GEORGE E. TURCOTTE
BY Charles A. Johnson
ATTORNEY

INVENTOR
GEORGE E. TURCOTTE
BY Charles U. Johnson
ATTORNEY

United States Patent Office
3,474,262
Patented Oct. 21, 1969

3,474,262
*n*-STATE CONTROL CIRCUIT

George E. Turcotte, St. Paul, Minn., assignor to Sperry Rand Corporation, New York, N.Y., a corporation of Delaware Filed Mar. 30, 1966, Ser. No. 538,830
Int. Cl. H03k *19/34, 19/24*
U.S. Cl. 307—289 4 Claims

ABSTRACT OF THE DISCLOSURE

An *n*-state digital control circuit is described. A plurality of logic stages, each having input gating circuits for receiving external control signals for controlling the states of the logic stages is shown. The input gating circuits are coupled to next-adjacent output circuits of the respective logic stages for providing controlled alteration of the state of the control circuit in response to the external control signals. Various gating configurations are shown for advancing or reversing the state of the control circuit. Gating arrangements are also shown for skipping certain stages, and for providing logical functions required to be controlled by two or more input signals for changing the state of the control circuit. Circuits are also shown for forcing the control circuit to a desired state irrespective of its initial condition.

Figure 1:
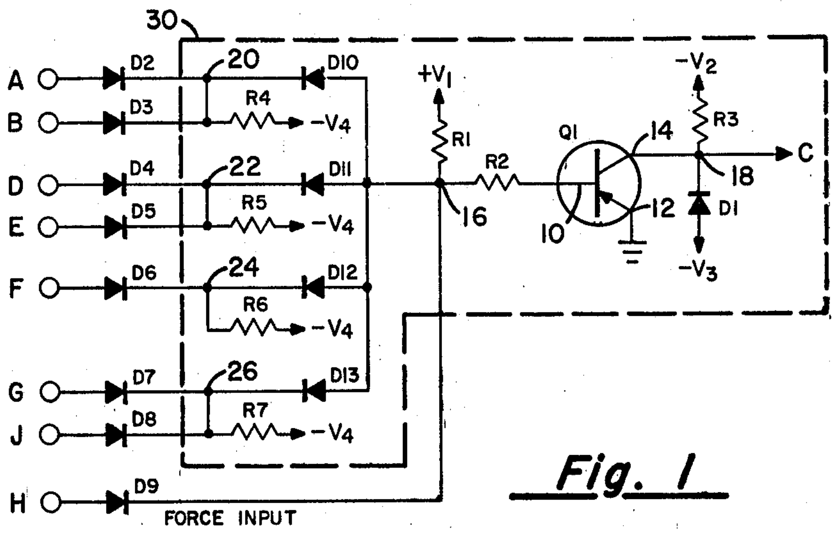

This invention relates to a stable *n*-state digital computer control circuit, and more particularly, to a logic circuit arrangement adapted for selectively providing voltage levels at selected output terminals in response to information and control signals applied to corresponding input terminals.

The prior art illustrates several different implementations of three-state logic elements and *n*-stable logic elements. These arrangements uniformly provide for utilizing circuits having two states of operation, that is, each stage comprises a circuit element capable alternatively of operating in a substantially current conducting mode or a non-current conducting mode. In these arrangements, the voltage level on the output terminal is indicative of the information represented by the state of the logic element. The prior art arrangements uniformly utilize input terminals coupled directly to the logic element of each stage. Such operation permits the circuit to be set into the state indicated by the signal applied to the input terminal. For instance, in a three-state device, three input terminals would be utilized respectively with three associated logic circuits. The logic circuits are intercoupled such that each provides circuit input signals to the other circuits in the arrangement indicative of the output signals of the logic element. Such devices are adapted for using input signals directly to the respective logic circuits. This direct input results in the disadvantageous operation that circuitry external to the three-state devices must be utilized to "remember" the state of the circuit. This requires considerable external control circuitry and is expensive in terms of components and operational time to allow the *n*-state devices to be utilized to the fullest extent.

To overcome the disadvantages of the prior art, this invention utilizes a combination of logic circuits to achieve a versatility of operation unavailable in the prior art. The logic circuits include the Sheffer stroke function (AND-inverter) as well as its dual, the Pierce function (OR-inverter). These logic circuits are commonly referred to respectively as NAND and NOR logic circuits. The *n*-state circuits of this invention also utilizes AND circuits. The logic circuits are arranged such that their output terminals are coupled respectively to each of the other logic circuit inputs in the circuit arrangement. Selected ones of the intercoupling paths include a logical AND circuit, commonly referred to as the gate circuit. The input terminals arranged for use with each of the logic circuits is coupled to a respectively associated gate circuit. The arrangement is such that the logical input signals require that they be provided in the appropriate order to cause the state of the circuit to advance. Random selection of input signals is not allowed due to the gating circuitry. This alleviates the necessity of external circuitry for remembering the state of the logic circuit. If erroneous signals are applied out of order, the circuit operation will not be affected and will stay in its previously set condition. An additional set of input terminals is provided with direct coupling to the logic circuits. These are the so-called "force input terminals" and provide overriding control for allowing the circuit to be set in any of its stable states irrespective of its previous operation condition. The absence of an input on all of the force input terminals leaves the state of the circuit unchanged, while the appearance of a force signal on any of the force input terminals causes an information signal to appear at the corresponding output terminal irrespective of the initial state of the device. The combination of the logic circuits and the gate circuits will be referred to as the control circuit.

In accordance with the foregoing an *n*-state control circuit is achieved where *n* is an integer greater than 2, and the *n*-state control circuit has *n*-stages in a predetermined intercoupled arrangement, each of which are capable of alternatively generating indicating nad nonindicating output signals and intercoupled such that only one of the *n*-stages generates an indicating signal and all other stages generate nonindicating signals at any given time, with each of said stages including a logic circuit having first and second alternative operating conditions, a first of the operating conditions providing an indicating signal, and a second of said operating conditions providing a nonindicating signal, and each logic circuit has an output terminal and at least two input terminals; gating means having at least two input terminals and an output terminal; a conductor for coupling the gating means output terminal to one of the logic circuit input terminals; another conductor means coupled to one of said gating means input terminals for receiving a control signal; still another conductor means for coupling an output terminal of a preceding stage to the other of the gating means input terminals; and the conductor means for coupling an output terminal of a succeeding stage to the other of the logic circuit input terminals, each stage arranged so that a predetermined combination of the control input signal and the output signal from the succeeding stage cause the logic circuit to be switched to said first operating condition.

An alternate embodiment of the control circuit provides for backing or reversing the state of the control circuit, as well as advancing the state in a predetermined order. The backing operation is achieved by utilizing an additional gating circuit for each stage. One of the input signals to the gate is a backing control pulse, and another input signal is the output signal from the next adjacent logical element. Yet another embodiment of the control circuit provides a further set of gates for causing the state to skip an adjacent state and be set in the next subsequent state in response to skip inputs control pulses.

Figure 2:
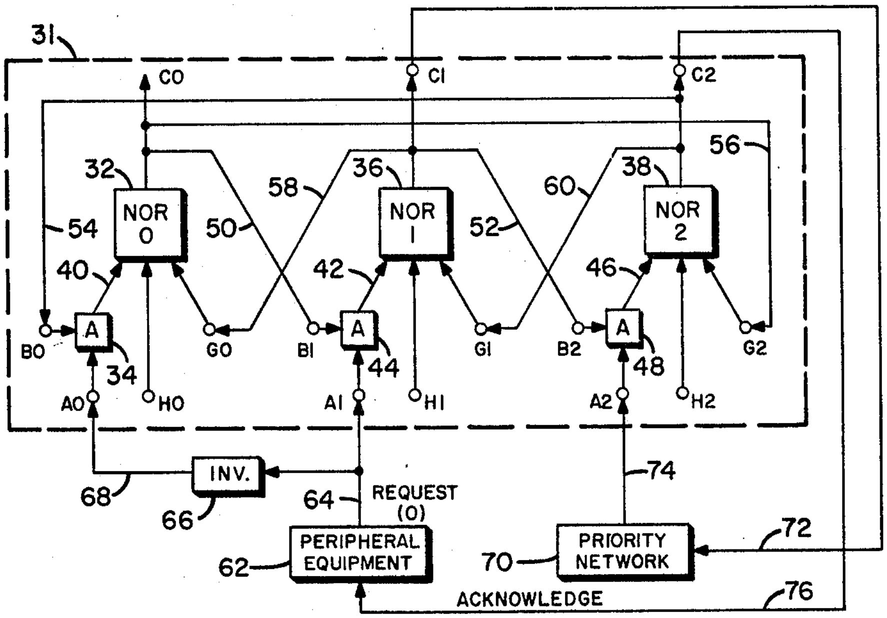
Figure 3:
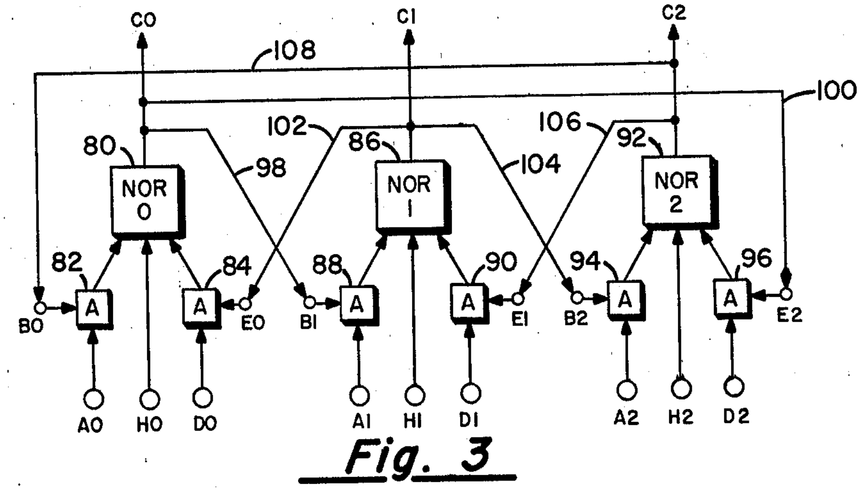
Figure 4:
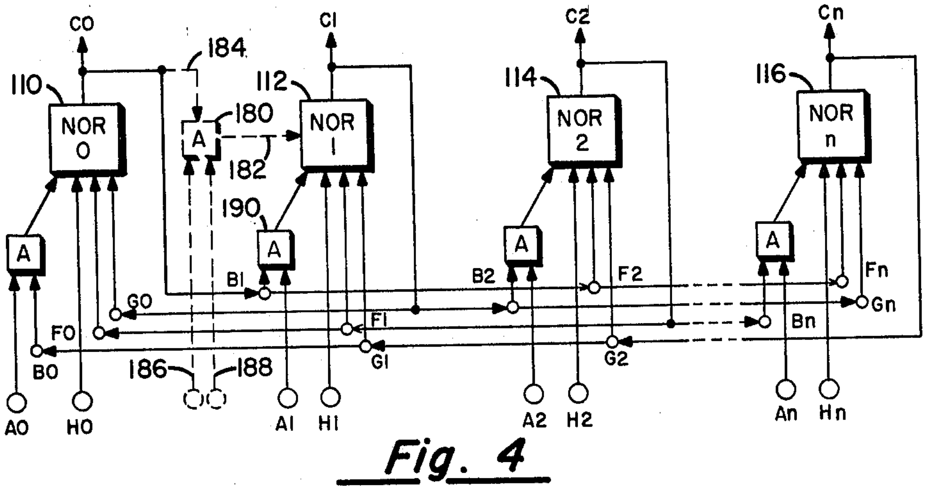
Figure 5:
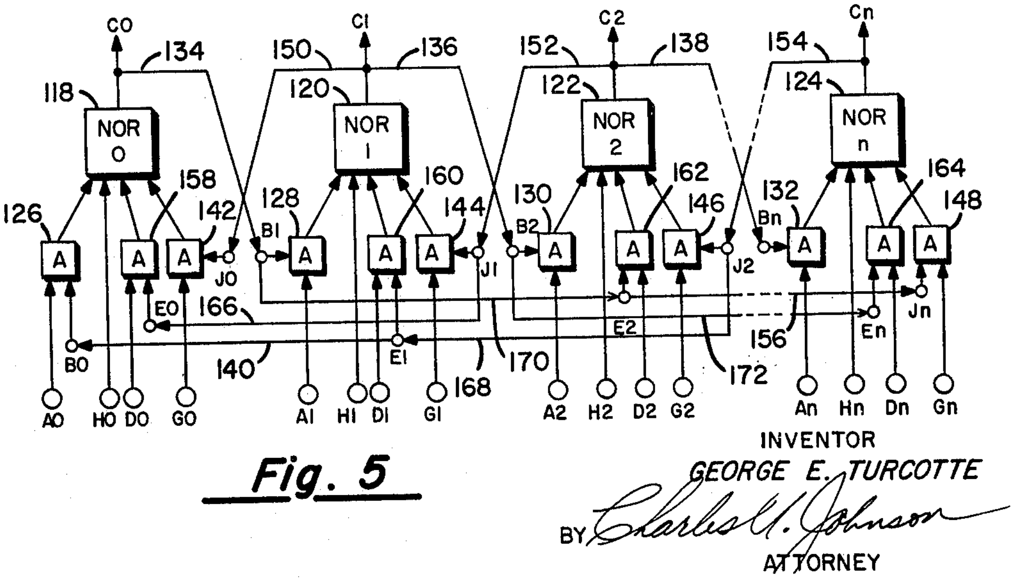

Other objectives in addition to the foregoing features and objectives of this invention, and the manner of obtaining them will become more apparent by reference to the following description taken in conjunction with the accompanying drawings, wherein: FIG. 1 is a circuit schematic diagram of a NOR circuit having AND logic circuits coupled to its input terminals; FIG. 2 is a logic diagram of a three-state control circuit; FIG. 3 is a logic diagram of a three-state control circuit capable of forward and backward advancement; FIG. 4 is a logic diagram of an *n*-state control circuit; and FIG. 5 is a logic diagram of an *n*-state control circuit capable of forward and rearward advancement.

Prior to detailed consideration of the various embodiments of the *n*-state control circuit illustrated herein, it is felt to be advantageous to consider briefly one form of logic circuits which can be utilized to implement the circuit configurations shown herein. A circuit such as illustrated in FIG. 1 can be utilized to perform the logical operations for each stage in the *n*-state control circuit.

The basic inverter portion of the circuit is comprised of transistor Q1 having a base electrode 10 and emitter electrode 12 and a collector electrode 14. The transistor Q1 has its emitter electrode coupled to a source of ground potential. The base electrode 10 is coupled to resistive element R2 which in turn is coupled to resistive element R1 at junction 16. Resistor R1 is adapted for coupling to a source of positive voltage $+V_1$. The collector terminal 14 is coupled to junction 18 which provides the output signal at terminal C. Point 18 is the common junction of resistor R3 and one terminal diode D1. Resistor R3 is adapted for coupling to a source of negative voltage $-V_2$. The other terminal of diode D1 is adapted for coupling to a clamping voltage $-V_3$. For this embodiment, the resistive elements are chosen to accommodate the power supply voltages available. Characteristically, voltage source $+V_1$ may be +15 volts DC, voltage $-V_2$ may be −15 volts DC, and voltage clamping source $-V_3$ may be −3 volts DC. In the quiescent operating state, the values of resistors R1 and R2 are characteristically such that base terminal 10 is maintained above ground potential and the transistor is in the off or nonconducting state. This results in clamping voltage $-V_3$ being impressed on the output terminal C. Diodes D10, D11, D12, and D13 have one of their respective terminals coupled in common to junction point 16. The other terminals of these diodes are respectively coupled to junction points 20, 22, 24 and 26. Resistors R4, R5, R6 and R7 have one terminal coupled to a source of negative potential $-V_4$ and have their other terminals respectively coupled to points 20, 22, 24, and 26. The operation of diodes D10, D11, D12, and D13 with their respectively associated resistors is to provide the OR function for the NOR circuits. The NOR circuit is shown enclosed in dashed block 30. The logical function of the NOR circuit is to provide an active output signal when its input signals are all inactive. This will be described in more detail below. Input terminals A and B are coupled to diodes D2 and D3 respectively, which in turn are coupled to common junction 20 thereby forming a longical AND circuit at junction 20. To provide an active signal at junction 20, it is necessary that active input signals be applied on both terminals A and B. Input terminals D and E are similarly associated with diodes D4 and D5 for forming an AND circuit at junction 22. Input terminal F is associated with diode D6 which in turn provides its sole signal source to junction 24. Input terminals G and J are respectively asociated with diodes D7 and D8 for providing an AND circuit at junction 26. Input terminal H is associated with diode D9 and provides the force input circuit path to junction 16.

For the embodiment described, and the folowing discussion, a logical 0 is defined as ground potential and a logical 1 is defined as a −3 volts DC potential, or an open-circuit input impedance. Of course, it is understood that various voltage values can be utilized to represent the corresponding binary quantities by simply adjusting component values and power supply values. Additionally, the use of NPN transistors at Q1 with the necessary changes in power supply values result in different component values and definition of binary values. The values of R1 and R2 are chosen such that when junction point 16 has a 0 signal impressed thereon from force input terminal H, the emitter-base junction is back-biased and transistor Q1 will be in the nonconducting state. As indicated above, this results in an output signal at terminal C dependent upon the clamping voltage $-V_3$ and for this embodiment a logical 1. The clamping diode D1 and clamping voltage $-V_3$ is utilized to prevent overdriving the transistor circuitry that may be coupled to the output terminal. When a logical 1 signal is provided to force terminal H junction 16 can be controlled by potential input signals from the other input terminals. To provide a logic controlled 1 output signal at terminal C, it is necessary that logical 0 input signals be applied at each junction 20, 22, 24 and 26. This results in a ground potential being applied to each of diodes D10, D11, D12 and D13 thereby causing point 16 to be biased such that the emitter-base junction of transistor Q1 is reverse biased and forcing transistor Q1 into the nonconductive state, thereby providing the clamped voltage $-V_3$ at the output terminal C. If any or all of junctions 20, 22, 24 or 26 is maintained at a logical 1 (−3 volts DC), junction 16 will be biased negative with respect to ground sufficiently to forward bias the emitter-base junction, and cause transistor Q1 to conduct. This conduction causes substantially 0 voltage drop acros the emitter-collector terminals and output terminal C is established as substantially 0 volt. Input terminals A and B will be taken as illustrative of the AND circuits. It is necessary to provide logical 1 input signals on each of terminals A and B to provide a 1 signal at junction 20. If either A or B, or both A and B receive logical 0 signals, junction 20 will be at ground potential. The circuit described above, the NAND circuit, or other circuit arrangements of equivalent logical operations may be utilized to implement the *n*-state control circuit of this invention. Many such circuits are well known in the art and it is not intended to limit this invention strictly to the use of the above described circuit.

FIG. 2 is the logical block diagram of a three-stable state control circuit implemented with NOR and AND logic elements (shown enclosed in dashed block 31). In this drawing, and in the drawings to follow, the arrowhead illustrates the direction of signal flow and also indicates a circuit junction connection. A NOR block such as NOR 0 labeled 32 represents a portion of the circuit of FIG. 1 enclosed in dashed block 30. The gating circuit or AND circuit is illustrated for instance as square 34 with "A" inserted therein. This coresponds to the AND input circuit, such as comprised of diodes D2 and D3 with resistor R4 to voltage source $-V_4$. For the remainder of the discussion, the logic block diagram approach will be utilized since the duplication of circuit schematics would not appear to aid in clarifying the invention.

The three-state control circuit is comprised of NOR 0 labeled 32, NOR 1 labeled 36, and NOR 2 labeled 38. Respectively associated force input terminals are designated H0, H1, and H2. NOR 0 receives an input signal on line 40 from AND 34; NOR 1 receives an input on line 42 from AND 44; and NOR 2 receives an input signal on line 46 from AND 48. NOR 0 output terminal C0 is coupled to input terminal B1 via conductor 50; NOR 1 output terminal C1 is coupled to input terminal B2 via conductor 52; and NOR 2 output terminal C2 is coupled to input terminal B0 via conductor 54. Output terminal C0 is coupled to input terminal G2 via conductor 56; output terminal C1 is coupled to input terminal G0 via conductor 58; and output terminal C2 is coupled to input terminal G1 via conductor 60. The logical input signals are applied to input terminals A0, A1 and A2. The force input signals, as described above, are applied to input terminals H0, H1 and H2.

The three-states are defined as follows:

(1) When NOR 0 is maintaining a logical 1 signal at C0, the three-state control circuit is in its "0" state;

(2) When NOR 1 is maintaining a logical 1 signal at terminal C1, the three-state control circuit is in its "1" state; and (3) When NOR 2 is maintaining a logical 1 signal at terminal C2, the three-state control circuit is in its "2" state.

It is noted that for any given condition, one and only one, output terminal will have a logical 1 output signal and that both of the other output terminals will be logical 0. For convenience of discussion, it can be considered that when NOR 0 provides a 1 signal at output terminal C0, the three-state control circuit is in its "clear" or "initialized" state. It should be understood of course, that any of the operating states described above can be considered to be the initialized state. One method of putting the three-state logic control circuit into this initialized state is to apply a logical 0 to input terminal H0. It will be recalled that the force input terminals H are coupled directly to the junction 16 of the respective NOR circuit 30. By applying a logical 0 to H0, NOR 0 is rendered nonconductive, and the signal at C0 will be forced to a logical 1. During the setting operation, it is necessary that at least terminal A1 have a logical 1 signal impressed thereon. The logical 1 output signal from NOR 0 is applied to input terminal B1 along with the 1 at A1. This combination of signals provides a 1 from gate 44 on conductor 42 as an input signal to NOR 1. It will be recalled that whenever one or more input terminals for the NOR circuit receives a 1 signal, the output signal therefrom will be 0. Accordingly, irrespective of other input signals, NOR 1 will thereby be switched to the 0-state due to the 1 signal. It can be seen that irrespective of its previous operating condition, the three-state control circuit has been forced into the condition where NOR 0 is providing a 1 output signal. The upper portion of Table I illustrates the various signal conditions at input and output terminals for forcing the three-state logic circuit into any of the three possible desired conditions. The dash entries indicate that the state of the designated signal is not controlling.

put signal via wire 46. NOR 1 will be left unaltered since the 1 input signal is maintained on input terminal A1 and the 1 signal applied via wire 50 to input terminal B1 causes a 1 signal to be applied to NOR 1 on conductor 42. The signal arrangement for switching NOR 0 to provide a 1 output signal is illustrated in Table I. The signals to be applied for switching the three-state control circuit such that NOR 1 provides a 1 at output terminal C1 is illustrated at line 5 of Table I, and the signal combination for causing NOR 2 to provide a 1 at output terminal C2 is illustrated in line 6 of Table I. It will be noted that the three-state device must be switched forward in sequence. For instance, assume that the control circuit is in the condition illustrated by line 6 of Table I wherein NOR 2 is providing a 1 output terminal C2. If an attempt is made to switch the three-state control circuit such that NOR 1 is providing an output of 1 to its output terminal C1 by applying a 0 to input terminal A1, it will be noted that the signal applied on line 60 to input terminal G1 will hold NOR 1 in the 0 output condition.

From the foregoing, it can readily be seen that a three-state control circuit arrangement of the type just described, can be utilized as a source of timing pulses, as a memory device for use in a tertiary computing system, and for a control function operation. An example of the control operation just referred to is also illustrated in FIG. 2. Copending patent application Ser. No. 156,374, filed Dec. 1, 1961, and assigned to the assignee of the subject invention describes an Input/Output system wherein a general purpose computer is coupled to one or more data handling devices. Operation is such that when the piece of external equipment desires to transfer information to the computer, a control line is supplied with an Input Request signal. The Input Request signal indicates to the computer which piece of peripheral equipment desires communication, and that data is ready to be transmitted. The Input Request signal is directed to a Priority Circuit in the computer which establishes when the computer

TABLE I

| Output | | | Force Input Signals | | | Advance Input Signals | | | Gated Latch Signals (FWD) | | | Unconditional Latch Signals | | |
|---|---|---|---|---|---|---|---|---|---|---|---|---|---|---|
| C0 | C1 | C2 | H0 | H1 | H2 | A0 | A1 | A2 | B0 | B1 | B2 | G0 | G1 | G2 |
| 1 | 0 | 0 | 0 | 1 | 1 | – | 1 | – | 0 | 1 | 0 | 0 | 0 | 1 |
| 0 | 1 | 0 | 1 | 0 | 1 | – | – | 1 | 0 | 0 | 1 | 1 | 0 | 0 |
| 0 | 0 | 1 | 1 | 1 | _0 | 1 | – | – | 1 | 0 | 0 | 0 | 1 | 0 |
| 1 | 0 | 0 | | | | 0 | 1 | – | 0 | 1 | 0 | 0 | 0 | 1 |
| 0 | 1 | 0 | (Must not be 0) | | | – | 0 | 1 | 0 | 0 | 1 | 1 | 0 | 0 |
| 0 | 0 | 1 | | | | 1 | – | 0 | 1 | 0 | 0 | 0 | 1 | 0 |

An alternative method of establishing a cleared (initialized) condition wherein NOR 0 is providing a 1 signal at terminal C0, is to provide either in sequence or simultaneously a 0 signal on both input terminals A2 and A0 thereby causing the state to progress automatically into the 0 state.

Having described how the three-state control circuit can be placed in a predetermined state, it will now be described how the state of the circuit is advanced. Referring to Table I, assume that NOR 2 is providing a 1 on terminal C2. In order to switch the state of the three-state device into the condition where NOR 0 is providing a 1 at terminal C0, it is necessary to disable AND 34 by providing a 0 at input terminal A0, while maintaining a 1 on input terminal A1. It will be noted that the 0 at terminal A0 will be applied via wire 40 as an input to NOR 0. Simultaneously, NOR 1 is maintaining a 0 output signal which will be applied to input terminal G0 via wire 58. Since both input signals to NOR 0 are of a 0 value, NOR 0 will provide a 1 signal to terminal C0. The 1 signal from NOR 0 will be applied on wire 56 to input terminal G2 of NOR 2, which will cause it to switch its output signal to 0 irrespective of the other inwill process the Input Request. When the Priority Circuit of the computer indicates that the computer will accept the data, the data lines are sampled and an Input Acknowledge signal is directed from the computer to the piece of peripheral equipment. The Input Acknowledge signal indicates to the peripheral equipment that its data lines have been sampled and that the Input Request signal can be dropped. Turning now to a consideration of FIG. 2 in this control capacity, it can be seen that Peripheral Equipment 62 has a conductor 64 coupled to input terminal A1. Additionally, conductor 64 is coupled to an Inverter circuit 66, of a type well known in the art. Inverter 66 has its output terminal coupled via conductor 68 to input terminal A0. Output terminal C1 is coupled to Priority Network 70 via conductor 72. The output of the Priority Network 70, which is indicative of the particular peripheral equipment 62, is coupled via conductor 74 to input terminal A2. Output terminal C2 is coupled via conductor 76 to Peripheral Equipment 62. In operation, it will be noted that the three-state device is initially set to the cleared state, that is, NOR 0 providing a 1 output signal. Peripheral Equipment 62 determines that it desires to communicate with the computer of which the three-state circuit can be a part. Peripheral Equipment 62 issues an Input Request signal (logical 0) on conductor 64. This causes the three-state circuit to switch such that NOR 1 provides a 1 signal on output terminal C1 (see Table I). The 1 signal thus provided at output terminal C1 is coupled to the Priority Network 70 via line 72 thereby advising the Priority Network that Peripheral Equipment 62 desires access to the computer. When Priority Network 70 determines that it will communicate with Peripheral Equipment 62, a signal is issued on line 74 to input terminal A2. This logical 0 input signal causes the three-state circuit to switch such that NOR 2 provides a 2 signal at output terminal C2. This signal at output terminal C2 is an Acknowledge signal directed to Peripheral Equipment 62, and indicates that the computer has sensed the data lines. This Acknowledge signal causes the Peripheral Equipment to drop the Input Request signal on conductor 64. When the Input Request signal is dropped (becomes a logical 1) Inverter circuit 66 causes a 0 to be applied to input terminal A0, and causes the three-state control circuit to switch such that NOR 0 provides a 1 signal at output terminal C0. When the foregoing sequence has been completed, the three-state control circuit is in a condition to accept ple, if it is assumed that the state of the three-state device is such that NOR 2 is providing a 1 to terminal C2, and it is desired to back the count so that NOR 1 is providing an output of logical 1 at terminal C1, it is necessary to maintain 1 input signals of each of advance input terminals A0 and A2 to maintain 1 input signals on reverse count gate input terminals D0 and D2. The input signal applied to input terminal D1 is switched to logical 0, and results in a logical 0 being applied to NOR 1 through gate 90. Since NOR 0 applies a 0 to input terminal B1 of AND 88 via conductor 98, both lines to NOR 1 are in the 0 state, and results in NOR 1 providing a logical 1 at its output terminal C1. A 1 at output terminal C1 will cause AND 94 to provide a 1 to NOR 2, thereby causing it to switch to the 0 state. NOR 0 will be held in the 0 state by the 1 provided via conductor 102 to input terminal E0. Accordingly, it can be seen that the desired backing of the count by one stage has been achieved. As in the case of advancing, it will be noted that it is required that the reversing to be an adjacent stage is not selectable at random. To alter the count at random, it is necessary to utilize force input terminals H0, H1, and H2 as previously described. Examples of advancing and reversing of the count are illustrated in Table II.

TABLE II

| Output Signals | | | Advance Input Signals | | | Reverse Input Signals | | | Gated Latch Signals Forward | | | Gated Latch Signals Reverse | | | Force Input Signals | | | |
|---|---|---|---|---|---|---|---|---|---|---|---|---|---|---|---|---|---|---|
| C0 | C1 | C2 | A0 | A1 | A2 | D0 | D1 | D2 | B0 | B1 | B2 | E0 | E1 | E2 | H0 | H1 | H2 | |
| 1 | 0 | 0 | - | 1 | - | - | - | 1 | 0 | 1 | 0 | 0 | 0 | 1 | 0 | 1 | 1 | |
| 0 | 1 | 0 | - | - | 1 | .1 | - | - | 0 | 0 | 1 | 1 | 0 | 0 | 1 | 0 | 1 | Force |
| 0 | 0 | 1 | 1 | - | - | - | 1 | - | 1 | 0 | 0 | 0 | 1 | 0 | 1 | 1 | 0 | |
| 1 | 0 | 0 | 0 | 1 | - | - | 1 | 1 | 0 | 1 | 0 | 0 | 0 | 1 | | | | |
| 0 | 1 | 0 | - | 0 | 1 | 1 | - | 1 | 0 | 0 | 1 | 1 | 0 | 0 | | | | Advance To |
| 0 | 0 | 1 | 1 | - | 0 | 1 | 1 | - | 1 | 0 | 0 | 0 | 1 | 0 | | | | |
| 0 | 1 | 0 | 1 | - | 1 | 1 | 0 | - | 0 | 0 | 1 | 1 | 0 | 0 | Must NOT be 0 | | | |
| 1 | 0 | 0 | - | 1 | 1 | 0 | - | 1 | 0 | 1 | 0 | 0 | 0 | 1 | | | | Reverse To |
| 0 | 0 | 1 | 1 | 1 | - | - | 1 | 0 | 1 | 0 | 0 | 0 | 1 | 0 | | | | |

further Input Request signals from the Peripheral Equipment 62. The foregoing is of course only one example of possible usage of the n-state circuit, and others are readily apparent.

Turning now to a consideration of FIG. 3 which is a logic block diagram of a three-state logic control circuit which is capable of both being advanced and reversed counted. NOR 0 labeled 80 has associated therewith advance gate 82, reverse gate 84, and force input coupled to terminal H0. NOR 1 labeled 86 has associated therewith an advance gate 88, reverse gate 90, and force input terminal H1. NOR 2 labeled 92 has associated therewith advance gate 94, reverse gate 96 and force input terminal H2. Each NOR circuit has its output terminal coupled to all other gate circuits in the arrangement. NOR 0 has its output signal at terminal C0 coupled to input terminal B1 via conductor 98 and to input terminal E2 via conductor 100. NOR 1 has its output terminal C1 coupled to input E0 via conductor 102 and to input terminal B2 via conductor 104. NOR 2 has its output terminal C2 coupled to input terminal E1 via conductor 106 and to input terminal B0 via conductor 108. The advance input terminals are A0, A1 and A2 while reverse count input terminals are D0, D1, and D2. Table II illustrates how the various circuit stages can be forced to output a logical 1 signal, and is accomplished in a manner similar to that described above. (See the first three lines of Table II. Advancing of the three-state control circuit illustrated in FIG. 3 is shown in the second three lines of Table II and is accomplished in a manner similar to that described above. Reversing of the count is accomplished as illustrated in the last three lines of Table II. As an exam- The concepts and configurations described in the foregoing circuit arrangement with regard to a three-state circuit may be applied to an *n*-state circuit where *n* is an integer of three or greater. The *n* state logic circuit illustrated in FIG. 4 is illustrated by four NOR circuits NOR 0 labeled 110, NOR 1 labeled 112, NOR 2 labeled 114, and NOR *n* labeled 116. Each of the NOR circuits has associated therewith an output terminal C followed by numerical designation as described above, and force input terminals H0, H1, H2 and H*n* are utilized to force the *n*-state logic circuit into the state indicated by the activated H input terminal. The advance or logic input signals are selectively applied to input terminals A0, A1, A2 or A*n*. As previously described, it can be seen that the output terminal of each NOR circuit is coupled to an input terminal of a next adjacent AND circuit and directly to the remaining NOR circuits in the system. The operation of advancing the state from stage to stage is precisely the same as described above. Table III illustrates the various signal conditions for switching the state of the *n*-state logic circuit from a condition where C0 is providing an output signal of 1 sequentially, through the entire loop until such time as C0 is again providing an output signal of 1. Again it will be pointed out for the *n*-state device that there is no necessity of external circuitry for recalling the condition of the logic circuit. In the event that an attempt is made to set a logic input out of sequence for this embodiment, the imput signal will be ineffective and the state of the circuit will remain the same. From the foregoing discussion it is readily apparent that as many stages can be utilized as are desired with the only limitation being to circuit consideration of fan-in and fan-out. The latter problems can be easily accommodated by utilizing treeing or branching circuitry to provide the required power.

TABLE III

| Output Signals | | | | Logic Input Signals | | | | Latch Signals | | | | | | | | | | | |
|---|---|---|---|---|---|---|---|---|---|---|---|---|---|---|---|---|---|---|---|
| C0 | C1 | C2 | Cn | A0 | A1 | A2 | An | F0 | F1 | F2 | Fn | B0 | B1 | B2 | Bn | G0 | G1 | G2 | Gn |
| 0 | 1 | 0 | 0 | – | 0 | 1 | – | 0 | 0 | 0 | 0 | 0 | 0 | 1 | 0 | 1 | 0 | 0 | 1 |
| 0 | 0 | 1 | 0 | – | – | 0 | 1 | 1 | 1 | 0 | 0 | 0 | 0 | 0 | 1 | 0 | 0 | 0 | 0 |
| 0 | 0 | 0 | 1 | 1 | – | – | 0 | 0 | 0 | 0 | 0 | 1 | 0 | 0 | 0 | 0 | 1 | 1 | 0 |
| 1 | 0 | 0 | 0 | 0 | 1 | – | – | 0 | 0 | 1 | 1 | 0 | 1 | 0 | 0 | 0 | 0 | 0 | 0 |

FIG. 5 is a logic diagram of an *n*-state control circuit which is capable of having the control output signal advanced uniformly from stage to stage, reversed uniformly from stage to stage, or shifted over alternate stages. NOR 0 labeled 118 provides its output signals to terminal C0; NOR 1 labeled 120 provides its output signal to terminal C1; NOR 2 labeled 122 provides its output signal to terminal C2; and NOR *n* labeled 124 provides its output signal to terminal C*n*. AND circuits 126, 128, 130 and 132 are respectively associated with advance signal input terminals A0, A1, A2 and A*n*, and further are respectively associated with NOR 0, NOR 1, NOR 2 and NOR *n*. Each of these AND circuits are arranged to also receive input signals from the next adjacent NOR circuit output terminal. Terminal C0 is coupled to AND 128 input terminal B1 via wire 134; output terminal C1 is coupled to AND 130 input terminal B2 via wire 136; output terminal C2 is coupled to AND 132 input terminal B*n* via wire 138; and output terminal C*n* is coupled to AND 126 input terminal B0 via wire 140. The advance input terminals A0, A1, A2 and A*n* operate as previously described to uniformly advance the state of the *n*-state circuit. AND circuits 142, 144, 146 and 148 are respectively associated with reverse count input terminals G0, G1, G2 and G*n*, and are respectively arranged to operate in conjunction with NOR 0, NOR 1, NOR 2 and NOR *n*. In addition to the reverse count signal inputs, each of the just mentioned AND circuits receives an input signal from the next adjacent NOR circuit. Output terminal C1 is coupled to AND 142 input terminal J0 via wire 150; output terminal C2 is coupled to AND 144 input terminal J1 via wire 152; output terminal C*n* is coupled to AND 146 input terminal J2 via wire 154; and output terminal C0 is coupled to AND 148 input terminal J*n* via wire 156. AND circuits 158, 160, 162 and 164 are respectively associated with shift input terminals D0, D1, D2 and D*n* and are respectively associated with NOR 0, NOR 1, NOR 2, and NOR *n*. Each of the shift AND circuits additionally receive input signals from another NOR circuit in the logic arrangement displaced by at least one NOR circuit from the stage under consideration. Terminal C2 is coupled to AND 158 input terminal E0 by wire 166; terminal C*n* is coupled to AND 160 input terminal E1 by wire 168; terminal C0 is coupled to AND 162 input terminal E2 by wire 170; and terminal C1 is coupled to AND 164 input terminal E*n* by wire 172. Table IV below illustrates a full sequence of advance pulses in the first four lines for sequencing the state of the *n*-state control circuit, starting with a force input on H0 for establishing an output of 1 at terminal C0, and continuing through three sets of advance pulses applied to advance terminals A1, A2 and A*n* for advancing the state of the circuit such that a 1 signal is sequentially available on output terminals C1, C2 and C*n*. This operation follows a similar pattern to that described in previous discussion. At the Reverse line of Table IV is illustrated the signal arrangements derived when the count is reversed by applying a 0 signal to reverse input terminal G2. Again, the reverse process is similar to that described above. It will be noted for both advance and reverse situations that it is required that the input pulses be received in a predetermined sequence in order to be effective. The Shift line of Table IV illustrates how the count can be shifted to skip an intermediate stage. Since the state of the control circuit is such that C2 is providing a 1 output signal, the state can be shifted such that C0 will provide a 1 output signal by providing a shift signal to input terminal D0. Such a shift signal causes NOR 0 to be switched from its 0 conduction state to its 1 conduction state. The propagation of the pulses through the control circuitry results in circuits NOR 1, NOR 2, and NOR *n* being switched to the 0 conduction state.

TABLE IV

| | | Advance | | | | Reverse | Shift |
|---|---|---|---|---|---|---|---|
| Output Signals | C0 | 1 | 0 | 0 | 0 | 0 | 1 |
| | C1 | 0 | 1 | 0 | 0 | 0 | 0 |
| | C2 | 0 | 0 | 1 | 0 | 1 | 0 |
| | C*n* | 0 | 0 | 0 | 1 | 0 | 0 |
| Advance Signals | A0 | – | – | – | 1 | 1 | – |
| | A1 | 1 | 0 | – | – | – | 1 |
| | A2 | – | 1 | 0 | – | – | – |
| | A*n* | – | – | 1 | 0 | 1 | 1 |
| Reverse Signals | G0 | – | 1 | 1 | – | – | – |
| | G1 | – | – | 1 | 1 | 1 | 1 |
| | G2 | – | – | – | 1 | 0 | – |
| | G*n* | 1 | 1 | – | – | – | 1 |
| Shift Signals | D0 | – | – | 1 | 1 | 1 | 0 |
| | D1 | – | – | – | 1 | 1 | – |
| | D2 | 1 | 1 | – | – | – | 1 |
| | D*n* | – | 1 | 1 | – | – | – |
| Latch Signals | B0 | 0 | 0 | 0 | 1 | 0 | 0 |
| | B1 | 1 | 0 | 0 | 0 | 0 | 1 |
| | B2 | 0 | 1 | 0 | 0 | 0 | 0 |
| | B*n* | 0 | 0 | 1 | 0 | 1 | 0 |
| | E0 | 0 | 0 | 1 | 0 | 1 | 0 |
| | E1 | 0 | 0 | 0 | 1 | 0 | 0 |
| | E2 | 1 | 0 | 0 | 0 | 0 | 1 |
| | E*n* | 0 | 1 | 0 | 0 | 0 | 0 |
| | J0 | 0 | 1 | 0 | 0 | 0 | 0 |
| | J1 | 0 | 0 | 1 | 0 | 1 | 0 |
| | J2 | 0 | 0 | 0 | 1 | 0 | 0 |
| | J*n* | 1 | 0 | 0 | 0 | 0 | 1 |
| Force | H0 | 0 | 1 | 1 | 1 | | |

From the foregoing it can be seen that illustrated in FIGURE 5 is an extremely versatile circuit which can be utilized by the appropriate application of combinations of input control signals by means not shown to achieve control signals for use as they may be needed. It is readily apparent to those skilled in the art that various combinations of input signals can be utilized to selectively advance, reverse, shift, or any combination thereof, the state of the control circuit.

Shown in dashed line in FIGURE 4 is an additional gate circuit 180 having a lead 182 coupling its output terminal to one of the input terminals of NOR 1. Gate 180 is adapted to receive input signals on lead 184 from output terminal C0, and on logic control lines 186 and 188. If NOR 0 is in the 1 state, a 0 signal on either lines 186 or 188 will cause a 0 to be impressed on line 182. To switch NOR 1 to the 1 state, a 0 signal is also required on input terminal A1. It can be seen, therefore, that input lines 186 and 188 effectively operate as logical OR control lines, since 0 signals on either will put the 0 on line 182. It should be noted that as many input lines to AND 180 as may be desired can be utilized. It can further be seen that gate circuits 180 and 190 effectively provide an AND control of NOR 1 since both must be satisfied to cause NOR 1 to be put in the indicating state. It is readily apparent that additional AND circuits can be coupled intermediate NOR 0 and NOR 1 in a similar manner, or can be coupled intermediate other stages either as to advancing, reversing, or skipping, as may be desired. It is of course also apparent that direct logic input signals to selected logic circuits, separate from the force input terminals, can be utilized.

Having now fully described and disclosed various embodiments and modes of operation of the invention, and it being understood that desired modifications within the scope and spirit of the invention will become obvious to those skilled in the art, what is intended to be protected by Letters Patent is set forth in the appended claims.

What is claimed is:

1. In an $n$-state control circuit, where $n$ is an integer greater than 2, the $n$-state control circuit having $n$-stages in a predetermined intercoupled arrangement, each of which are capable of alternatively generating indicating and nonindicating output signals and intercoupled such that only one of the $n$-stages generates an indicating signal and all other stages generate nonindicating signals at any given time, each of said stages comprising:

a logic circuit having first and second alternative operating conditions, a first of said operating conditions providing an indicating signal, a second of said operating conditions providing a nonindicating signal, said circuit having an output terminal and at least two input terminals;

gating means having at least two input termials and an output terminal;

means for coupling said gating means output terminal to one of said logic circuit input terminals;

means coupled to one of said gating means input terminals for receiving an external control signal;

means for coupling an output terminal of a preceding stage to the other of said gating means input terminals; and means for coupling an output terminal of a succeeding stage to the other of said logic circuit input terminals, a predetermined combination of said external control input signal and the output signal from the succeeding stage causing said logic circuit to be switched to said first operating condition; and an additional gating means having an output terminal and a pair of input terminals, the output terminal of said additional gating means coupled to the other of said logic circuit input terminals, and one of said pair of input terminals coupled to the output terminal of the succeeding stage, and the other of said pair of input terminals including means for receiving a second external control signal.

2. A computer circuit for collectively providing one of $n$ possible stage states, where $n$ is an integer greater than 2, the computer circuit having $n$ similar stages, each stage being capable of alternatively generating indicating and nonindicating output signals in response to a predetermined combination of input signals, the stages being intercoupled such that only one of the stages is generating an indicating signal and all other stages are generating nonindicating signals at any given time and the selection of the stage for generating the indicating signal being indicative of the state of the $n$-state control circuit, said $n$-state control circuit comprising:

$n$ logic circuits arranged in a predetermined order, each having an output terminal and at least $n-1$ logic input terminals, and each having a first operating condition for providing an indicating signal at said output terminal when like input signals of a first predetermined voltage level are received on all of said $n-1$ logic input terminals and having a second alternative operating condition for providing a nonindicating signal at said output terminal when unlike input signals or like input signals of a second predetermined voltage level are received on said $n-1$ logic terminals;

$n$ advance-state gating circuits, each having an output terminal coupled to a first of said $n-1$ logic input terminals of a respectively associated one of said logic circuits, and a first input terminal coupled to the output terminal of the preceding ordered one of said logic circuits, and a second input terminal for receiving an external advance-state control input signal, said gating circuits controlling the ordered advance of the state of the control circuit;

means for coupling the output terminal of each of said logic circuits to ones of said $n-1$ logic input terminals of all but the respectively next succeeding ones of said logic circuits; and $n$ reverse-state gating circuits, each having an output terminal coupled to a second of said $n-1$ logic input terminals of a respectively associated one of said logic circuits, a first input terminal coupled to the output terminal of the succeeding ordered one of said logic circuit, and a second input terminal for receiving an external reverse-state control input signal, said reverse-state gating circuits controlling the ordered reverse of the state of the control circuit.

3. A circuit as in claim 2 and further including $n$ skip-state gating circuits, each having an output terminal coupled to one of said $n-1$ logic terminals of a respectively associated one of said logic circuits, a first input terminal coupled to the output terminal of a predetermined non-adjacent one of said logic circuits, and a second input terminal for receiving an external skip-state control input signal, said skip-state gating circuits controlling the ordered alteration of the state of the control circuit by by-passing intermediate stages.

4. A circuit as in claim 2 wherein at least one of said logic circuits has at least $n$ logic input terminals and further including additional gating means coupled intermediate said one logic circuit and another one of said logic circuits, said additional gating means including an output terminal coupled to one of $n$ logic input terminals of said one logic circuit, a first input terminal coupled to the output terminal of said another logic circuit, and at least a second input terminal for receiving a change-of-state input control signal, said additional gating means operating at least in part to control the state of said one logic circuit.

References Cited

UNITED STATES PATENTS

| | | | |
|---|---|---|---|
| 3,012,155 | 12/1961 | Jagger | 307—289 X |
| 3,079,513 | 2/1963 | Yokelson | 307—223 X |
| 3,178,590 | 4/1965 | Heilweil et al. | 307—289 X |
| 3,272,993 | 9/1966 | Somlyody | 328—49 X |
| 3,275,848 | 9/1966 | Bell | 307—289 |
| 3,304,436 | 2/1967 | Kliwikowski | 328—49 X |

DONALD D. FORRER, Primary Examiner

J. D. FREW, Assistant Examiner

U.S. Cl. X.R.

307—215, 218, 221, 222, 223; 328—44